US009807304B2

United States Patent
Wang (10) Patent No.: US 9,807,304 B2
(45) Date of Patent: Oct. 31, 2017

(54) MULTI-FUNCTIONAL LIGHTING DEVICE WITH INTELLIGENT NETWORK MONITORING AND A MONITORING METHOD THEREOF

(71) Applicant: Xiamen Xing HengLong Lighting Technology Co., Ltd., Xiamen (CN)

(72) Inventor: Hongyan Wang, Xiamen (CN)

(73) Assignee: Xiamen Xing Henglong Lighting Technology Co., Ltd., Xiamen (CN)

( * ) Notice: Subject to any disclaimer, the term of this patent is extended or adjusted under 35 U.S.C. 154(b) by 535 days.

(21) Appl. No.: 14/286,429

(22) Filed: May 23, 2014

(65) Prior Publication Data
US 2015/0264260 A1   Sep. 17, 2015

(30) Foreign Application Priority Data

Mar. 12, 2014  (CN) .......................... 2014 1 0090760

(51) Int. Cl.
*H04N 5/232* (2006.01)
*H04N 5/235* (2006.01)
*H04N 7/18* (2006.01)

(52) U.S. Cl.
CPC ....... *H04N 5/23241* (2013.01); *H04N 5/2354* (2013.01); *H04N 7/183* (2013.01)

(58) Field of Classification Search
CPC ... H04N 5/23241; H04N 5/2354; H04N 7/183
See application file for complete search history.

(56) References Cited

U.S. PATENT DOCUMENTS

| | | | | |
|---|---|---|---|---|
| 6,046,721 A | * | 4/2000 | Song ...................... | G09G 1/165 345/13 |
| 2007/0013557 A1 | * | 1/2007 | Wang ....................... | B64F 1/20 340/945 |
| 2007/0041727 A1 | * | 2/2007 | Lee ......................... | G03B 17/02 396/427 |
| 2008/0092248 A1 | * | 4/2008 | He ............................ | G06F 1/26 726/36 |
| 2008/0129498 A1 | * | 6/2008 | Howarter ................. | G08B 3/10 340/541 |
| 2008/0310850 A1 | * | 12/2008 | Pederson ............ | G07C 9/00158 398/135 |
| 2009/0244310 A1 | * | 10/2009 | Kuwazoe ............. | H04N 5/2258 348/222.1 |
| 2010/0201267 A1 | * | 8/2010 | Bourquin ........... | H05B 37/0245 315/32 |
| 2010/0208068 A1 | * | 8/2010 | Elsemore ............ | A01M 31/002 348/143 |

(Continued)

*Primary Examiner* — MD Haque
(74) *Attorney, Agent, or Firm* — Wang Law Firm, Inc.

(57) ABSTRACT

A multi-functional lighting device with intelligent network monitoring and a monitoring method thereof, the lighting device comprises a power device, a monitor, a motor device, a motor driving circuit, a Wifi receiving-sending module, a single chip circuit, a microwave inductive circuit, a light inductive circuit, a constant current circuit and a light source; an output of the power supply is connected to the single chip circuit, and an output of the microwave inductive circuit is connected to an input of the single chip circuit, an output of the single chip circuit is connected to an input of the constant current circuit, an output of the constant current circuit is connected to the light source.

10 Claims, 7 Drawing Sheets

(56) References Cited

U.S. PATENT DOCUMENTS

2011/0018688 A1* 1/2011 Hanada ............. H04L 12/40013
340/10.1
2011/0280599 A1* 11/2011 Ino ..................... G03G 15/0189
399/44

* cited by examiner

MULTI-FUNCTIONAL LIGHTING DEVICE WITH INTELLIGENT NETWORK MONITORING AND A MONITORING METHOD THEREOF

This application claims the benefit of priority to CN 20140090760.6, filed on Mar. 12, 2014 with the State Intellectual Property Office of the People's Republic of China, the specification of which is incorporated herein in its entirety by reference.

FIELD OF THE INVENTION

The present invention relates to a lighting device, especially to a multi-functional lighting device with intelligent network monitoring and a monitoring method thereof.

BACKGROUND OF THE INVENTION

Lighting devices are one of the necessary living goods in people's daily life, with the lighting devices, people work, learn, live and create in the nighttime as daytime. Lighting devices are not only used to light, but also used to decorate, in nighttime, with the lighting devices, our city, streets, communities, malls, hotels, factories, tourist spots and the countries are becoming colorful in nighttime, so that people we can enjoy our life. However, using a mass of lighting devices causes a tension supply of energy. To reduce the waste of power electric energy, in existing technology, there is optical controlled lighting device, for example, the lighting device is turned off in daytime and turned on in nighttime, but this kind of control mode of lighting devices still have to work for a long period; some other time bucket controlled lighting devices are turned on only during a specific period and tuned off during other period, but this kind of the control mode of lighting devices are inconvenient in the off period; there is still sound controlled lighting devices, when there is a sound, the lighting device is turned on, when the sound disappears, the lighting device is turned off, but this kind of control mode of lighting devices are off if the sound is not loud enough, resulting in inconvenient, besides, this kind of lighting devices go against theft deterrent.

On the other hand, with the popularizing of monitoring, many places like factories, mall, hotels, schools, park places, office buildings are assembled with monitoring devices, even at home, the monitoring devices protect human security. But there are still some problems, for example, the monitoring pictures are clear under the strong light in daytime, but in nighttime, the monitoring pictures are not clear enough, so that to ensure clear pictures, it has to provide illumination, resulting in a waste of electric energy; for example, the monitoring devices are acquiring monitoring pictures 24 hours per day, but there is no human being in most of monitoring pictures, when to find out the monitoring pictures with human being, it is not convenient to find segment by segment, when to real-time monitor, it needs someone to monitor the pictures, resulting in a waste of human resource.

SUMMARY OF THE INVENTION

The object of the present invention is to overcome the disadvantages of the existing technology and provide with a multi-functional lighting device with intelligent network monitoring and a monitoring method thereof, combining a lighting device and network monitoring, when there is someone, the lighting device is turned on, the network monitor sends out a clear monitoring picture, so that it not only solves the energy conservation problem of the existing lighting device, but also solves the problems of the existing network monitor that the monitoring pictures are not clear enough and the monitor can not real-time monitor.

The technical proposal of the present invention to solve the technical problems is:

A multi-functional lighting device with intelligent network monitoring comprising:

a power supply used to supply power signal;

a monitor used to acquired monitoring pictures;

a motor device used to control a camera of the monitor to rotate;

a motor driving circuit used to drive the motor device to work;

a Wifi receiving-sending module used to connect to a wireless router for wireless internet access.

a single chip circuit used to analyze, judge and process the input signals and output corresponding control signals;

a microwave inductive circuit used to sense a distance between a human being and the lighting device;

a constant current circuit used to supply a constant current to the light source;

a light source used to send light;

thereinto, an output of the power supply is connected to the single chip circuit; an output of the microwave inductive circuit is connected to an input of the single chip circuit, an output of the single chip circuit is connected to an input of the constant current circuit, an output of the constant current circuit is connected to the light source; the monitor is connected to the single chip circuit; the single chip circuit is connected to the Wifi receiving-sending module; an output of the single chip circuit is connected to an output of the motor driving circuit, an output of the motor driving device is connected to the motor device;

the single chip circuit judges a signal of the microwave inductive circuit, when the signal satisfies the preset condition, the single chip circuit sends a control signal to the constant current circuit to make the light source lighted, at the same time, the single chip circuit sends the picture the monitor acquires to a specified mobile terminal by the Wifi receiving-sending module, and receives a command from the specified mobile terminal to send a control signal to the motor driving circuit to control the camera of the monitor to rotate.

It further comprises a light inductive circuit to sense the light intensity, an output of the light inductive circuit is connected to the single chip circuit.

It further comprises a light regulation circuit, an output of the light regulation circuit is connected to an output of the single chip circuit, an output of the light regulation circuit is connected to a control end of the constant current circuit.

It further comprises a humidity inductor, an output of the humidity inductor is connected to the single chip circuit.

The preset condition is that the microwave inductive circuit senses that the distance between a human body and the lighting device is less than or equal to 6 meters.

The motor device comprising a first motor to control the camera of the monitor to rotate left and right and a second motor to control the camera of the monitor to rotate up and down, two outputs of the motor driving circuit are respectively connected to the first motor and the second motor.

The angle of rotation left and right of the camera is 0-174° left and 0-174° right; the angle of the rotation up and down of the camera is 0-54° up and 0-54° down.

The single chip circuit sends the pictures the monitor acquires to a specified mailbox to be saved by the Wifi receiving-sending module.

The power supply comprising a power adapter and a storage battery, the storage battery is connected to the power adapter, an output of the power adapter is connected to the single chip circuit.

The power supply further comprising a solar energy panel, the solar energy panel is connected to the storage battery.

The light source is a COB chip.

A monitoring method for a multi-functional lighting device with intelligent network monitoring, wherein the method comprising:

A. a microwave inductive circuit real-time senses whether a human being closes to the lighting device, a monitor real-time acquires preset area of scenes surround the lighting device;

B. when the microwave inductive circuit senses a human being, it outputs the inductive signal to a single chip circuit, the single chip circuit outputs a control signal to a constant current circuit to drive the constant current circuit to work, the constant current circuit outputs electric energy to a light source to make the light source lighted; at the same time, the single chip circuit extracts the picture the monitor acquires;

C. the single chip circuit sends out the pictures the monitor acquires in a preset sending mode via a Wifi receiving-sending module and a wireless router; the preset sending mode comprising sending the pictures the monitor acquires to a specified mailbox and save, sending to a specified mobile terminal, the mobile terminal receives the pictures synchronously, the mobile terminal alerts according to a presetting of the mobile terminal;

D. a mobile terminal user operates a soft-keyboard of the mobile terminal up and down or to and fro, a central processor of the mobile terminal sends out the corresponding operation signals by the mobile terminal, the single chip circuit receives the operation signals by the network and the wireless router and the Wifi receiving-sending module, and then after the single chip circuit analyzes, judges and processes the operation signals, the single chip circuit outputs a control signal to a motor driving circuit, the motor driving circuit drives a first motor and a second motor to work, so that the operation up and down or to and fro of the mobile terminal user on the soft-keyboard is synchronous with the rotation up and down or to and fro of the camera, thus real-time monitoring the activity of entering human in a monitoring area;

E. when the microwave inductive circuit senses that the human being left, the microwave inductive circuit outputs the inductive signal to the single chip circuit, the single chip circuit outputs a control signal to the constant current circuit to make the constant current circuit inactive, the constant current circuit stops supplying energy to the light source, the light source stops lighting; at the same time, the single chip circuit stops sending out the pictures the monitor acquires.

The multi-functional lighting device with intelligent network monitoring and the monitoring method of the present invention is applied with mechanical and automatic control mechanism combined with a plurality of inductors, the single chip 24 automatically controls the on-off of the lighting device and the light intensity with monitoring function. The present invention is disposed with high energy lithium-ion battery, so that it works even in an off main supply situation, it can be served as an emergency light. The present invention is applied with the inductors to sense a change of the environment, and sends analog signals to the single chip, after the single chip is processed, it sends out a control signal to control the stepper motor and the lighting device to work. When a human being closes, the lighting device automatically turns on to send light and takes pictures, the pictures are to a preset mobile terminal via WIFI, the mobile terminal can control the camera to rotate up and down or left and right. The present invention is applied with a microwave inductive circuit and a light inductive circuit to automatically turn on the lighting device to send light when there is someone near by and the environmental light is weak. the present invention is applied with the humidity inductor to automatically adjust the color temperature according to the humidity of the environment, in high humidity day, for example in a foggy weather, the lighting device sends out low color temperature light, low color temperature light has strong penetrability, which is visible far. The chip of the lighting device of the present invention is a GRB COB chip, by changing the proportions of each primary color to adjust different color temperatures and colors, so that the light color is adjustable according to personal favor, or the color is automatically adjusted to make a better mood.

The multi-functional lighting device with intelligent network monitoring, when severed as a lighting device, is powered by main supply when the main supply normally works, it also can be powered by the storage battery when the main supply is turned off, the light inductive circuit is used to control the lighting device, in daytime, as the light is strong, the light inductive circuit senses the light intensity, sends a light inductive signal to the single chip circuit, the single chip circuit compares the signal of the light inductive circuit with a built-in parameter, the single chip circuit controls the power device not to supply power to the light source, so that the light source doesn't send light; in nighttime or when the light is weak, the light inductive circuit sense the light intensity and sends a light inductive signal to the single chip circuit, the single chip circuit compares the signal of the light inductive circuit with a built-in parameter, the single chip circuit controls the power device to supply power to the light source. In the present invention, the single chip circuit is set that the lighting device sends light when there is someone closing and the lighting device doesn't send light when no one closes. As a monitoring device, the monitor works all day, when there is someone closing to the monitoring area, the lighting device sends light, the camera take pictures to the entering human being, the pictures are sent to a preset mailbox via wireless router 4, and the preset mobile terminal alerts. The mobile terminal has a wireless internet connection to inquire the monitoring area, by the soft-keyboard of the mobile terminal, an area of 0-348° left and right and 108° up and down is visible. The camera is disposed with two motors, one motor controls the camera to rotate left and right, the other one controls the camera to rotate up and down.

Compared to the existing technology, the advantages of the present invention are:

The present invention combines a lighting device with network monitoring, when there is someone, the lighting device is turned on, the network monitor sends out a clear monitoring picture, so that it not only solves the energy conservation problem of the existing lighting device, but also solves the problems of the existing network monitor that the monitoring pictures are not clear enough and the monitor can not real-time monitor.

The power device of the present invention is applied with a power adapter and a storage battery, so that if the power is turned off or there is no electric power supplied, the power device can still supply emergency lighting and monitoring; if the lighting device is used outdoor, and with a solar energy panel, the solar energy panel can charge the storage battery, thus the present invention is with well energy conservation effect.

The present invention is applied with microwave inductive circuit to sense that if there is someone passing by, the light regulation circuit controls the lightness of the light source, which largely reduces the energy consumption of power device, the present invention has obvious energy conservation effect.

The present invention will be further described with the drawings and embodiments; but a multi-functional lighting device with intelligent network monitoring and a monitoring method thereof are not limited to the embodiments.

DETAILED DESCRIPTION OF THE EMBODIMENTS

Figure 3:
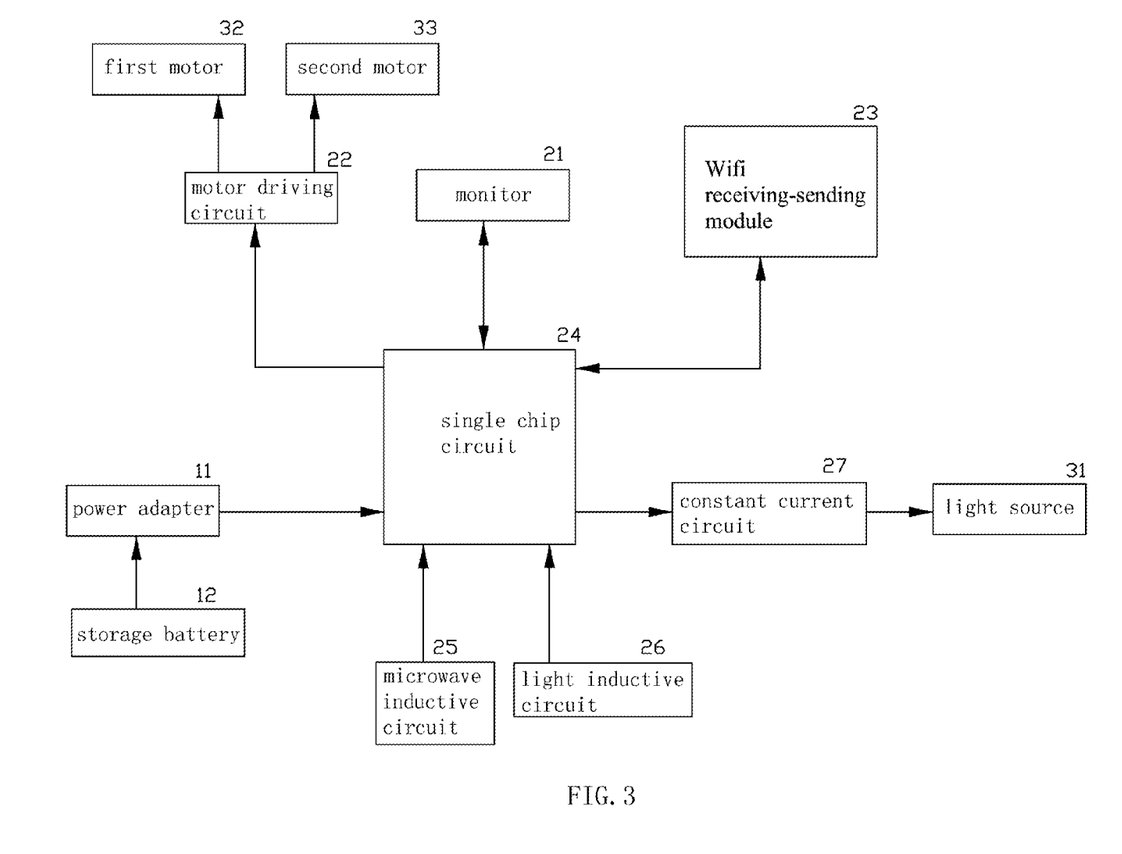
FIG. 3 illustrates a block diagram of circuit principle of the lighting device of the first embodiment of the present invention.

The first embodiment, as figured in FIG. 1 to FIG. 4, a multi-functional lighting device with intelligent network monitoring, wherein comprising:

a power supply used to supply power signal;

a monitor 21 used to acquired monitoring pictures;

a motor device used to control a camera 56 of the monitor 21 to rotate; the motor device comprising a first motor 32 to control the camera of the monitor to rotate left and right and a second motor 33 to control the camera of the monitor to rotate up and down;

a motor driving circuit 22 used to drive the first motor and the second motor to work;

a Wifi receiving-sending module 23 used to connect to a wireless router for wireless internet access;

a single chip circuit 24 used to analyze, judge and process the input signals and output corresponding control signals;

a microwave inductive circuit 25 used to sense a distance between a human being and the lighting device;

a light inductive circuit 26 used to sense the light intensity;

a constant current circuit 27 used to supply a constant current to the light source;

a light source 31 used to send light;

thereinto, an output of the power supply is connected to the single chip circuit 24; an output of the microwave inductive circuit 26 and an output of the light inductive circuit 26 is connected to an input of the single chip circuit 24, an output of the single chip circuit 24 is connected to an input of the constant current circuit 27, an output of the constant current circuit 27 is connected to the light source 31; the monitor 21 is connected to the single chip circuit 24; the single chip circuit 24 is connected to the Wifi receiving-sending module 23; an output of the single chip circuit 24 is connected to an output of the motor driving circuit 22, an output of the motor driving device 22 is respectively connected to the first motor 32 and the second motor 33.

The single chip circuit 24 judges a signal of the microwave inductive circuit 25, when the signal satisfies the preset condition, the single chip circuit sends a control signal to the constant current circuit 27 to make the light source 31 lighted, at the same time, the single chip circuit 24 sends the picture the monitor 21 acquires to a specified mobile terminal by the Wifi receiving-sending module 23, and receives a command from the specified mobile terminal to send a control signal to the motor driving circuit 22 to control the camera 56 of the monitor 21 to rotate.

The power supply comprising a power adapter 11 and a storage battery 12, the storage battery 12 is connected to the power adapter 11, an output of the power adapter 11 is connected to the single chip circuit 24, an input of the power adapter 11 is connected to the mains supply.

The light source 31 is a COB chip.

The preset condition is that the microwave inductive circuit senses that the distance between a human body and the lighting device is less than or equal to 6 meters.

The angle of rotation left and right of the camera 56 is 0-174° left and 0-174° right; the angle of the rotation up and down of the camera 56 is 0-54° up and 0-54° down.

Figure 4:
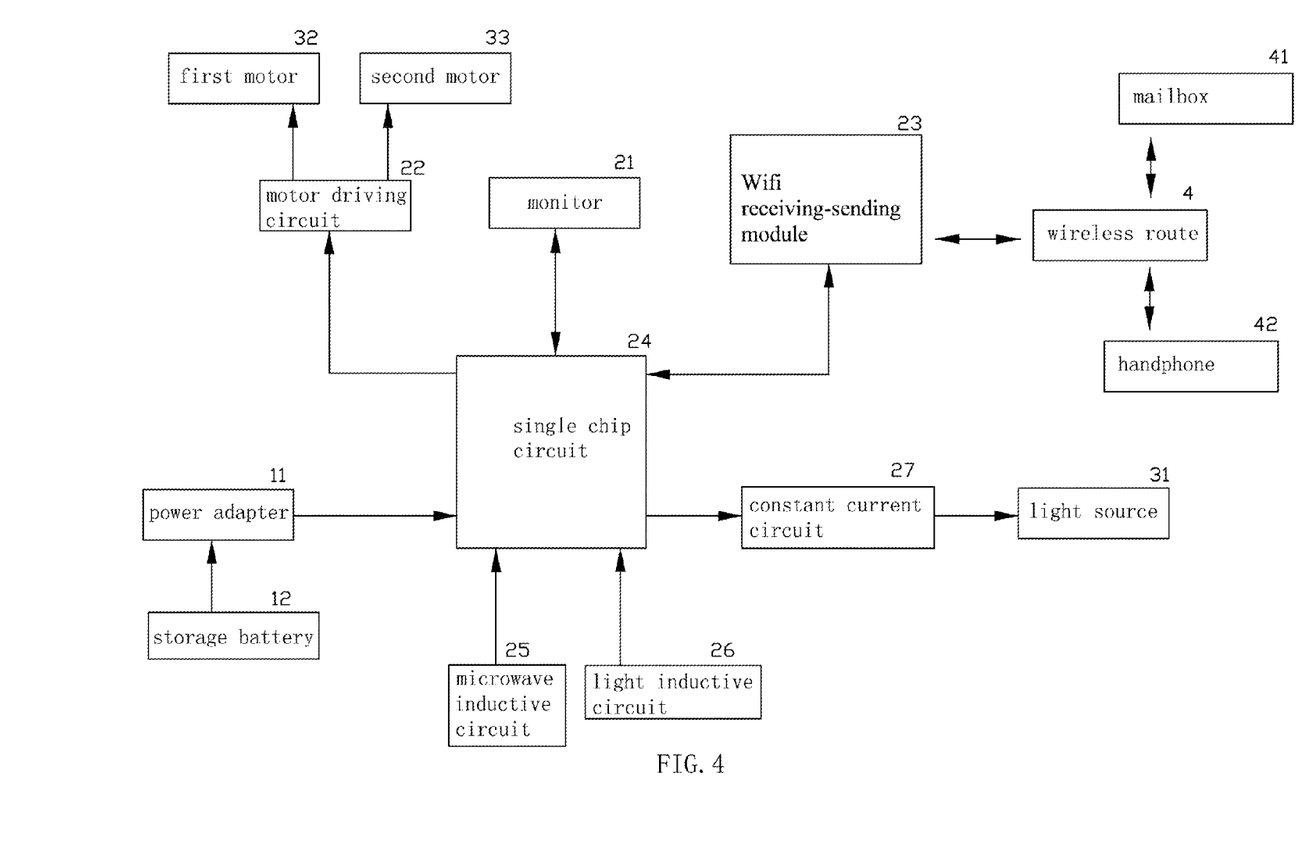
FIG. 4 illustrates a composition of the monitoring method system of the first embodiment of the present invention.

The single chip circuit sends the pictures the monitor acquires to a specified mailbox 41 to be saved by the Wifi receiving-sending module.

The specified mobile terminal is a specified hand phone 42.

Figure 1:
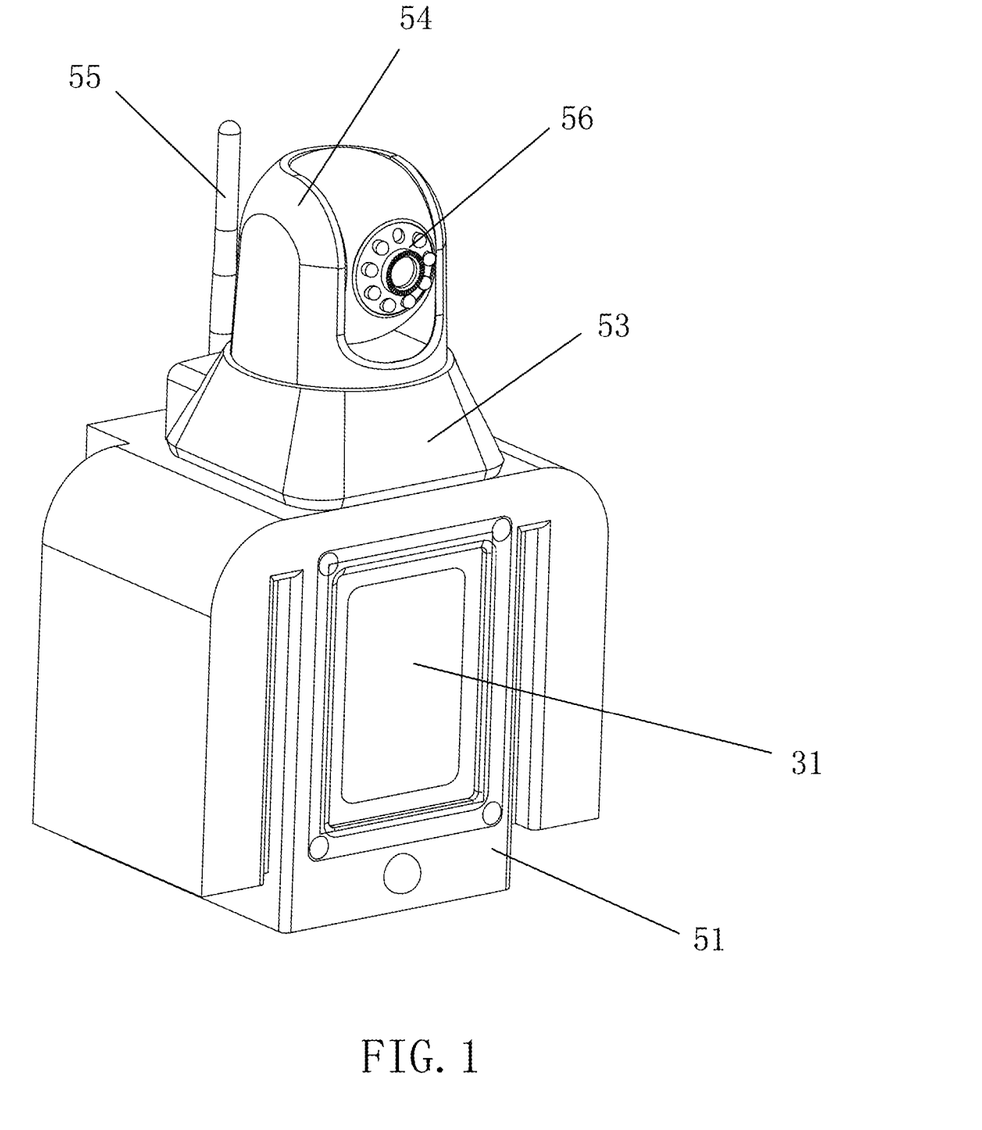
FIG. 1 illustrates a schematic diagram of a lighting device of the first embodiment of the present invention.
Figure 2:
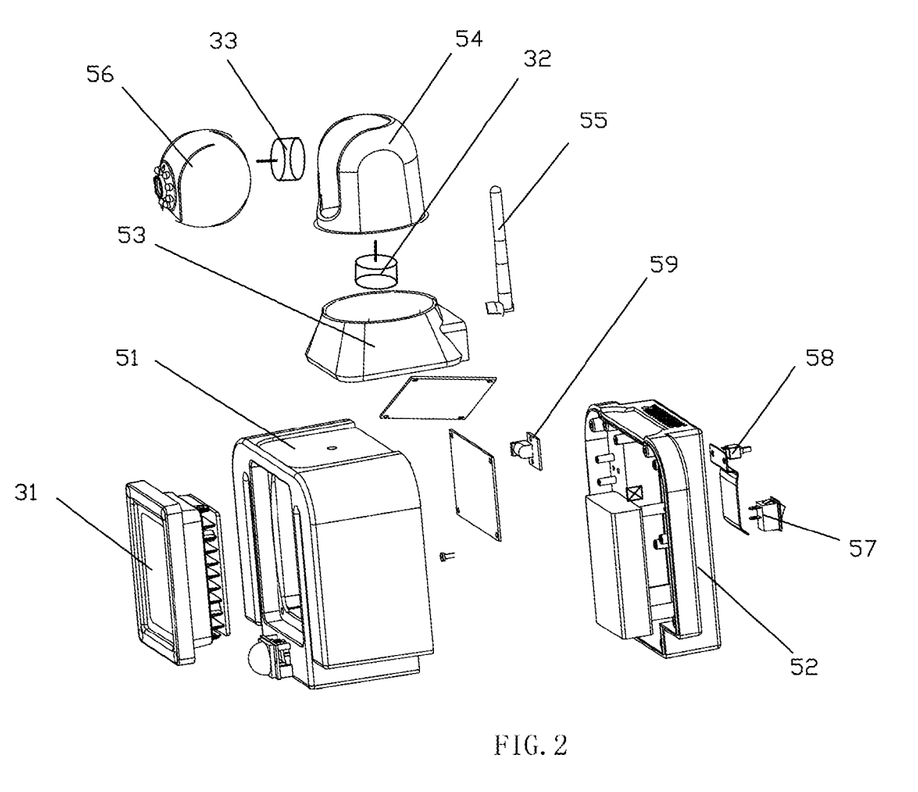
FIG. 2 illustrates an exploded diagram of the lighting device of the first embodiment of the present invention.

A multi-functional lighting device with intelligent network monitoring has its mechanical structure as figured in FIG. 1 and FIG. 2, comprising a front housing 51, a rear housing 52, a motor base 53 and a motor frame, the front housing 51 is fixed to the rear housing 52, the motor base 53 is fixed to the composition component of the front housing 51 and the rear housing 52, the motor frame 54 is assembled to the motor base 53, a Wifi antenna 55 is assembled to the rear housing 52, the camera 56, the first motor 32 and the second motor are respectively assembled to the motor frame 54, the light source 31 is assembled to the front housing 51, the storage battery 12 and a single chip are assembled to the space surrounded by the front housing 51 and the rear housing 52, each inductor is respectively assembled to the front housing 51, the rear housing 52 or the space surrounded by the front housing 51 and the rear housing 52 according to its function and work, the rear housing 52 is further disposed with a power switch 57, a function switch 58 and a power socket 59.

The directions up and down, left and right, front and rear of the present invention are referred to a front direction the light source and the camera face.

A monitoring method of a multi-functional lighting device with intelligent network monitoring of the present invention comprises:

A. the microwave inductive circuit 25 real-time senses whether a human being closes to the lighting device, the monitor 21 real-time acquires preset area of scenes surround the lighting device;

B. when the microwave inductive circuit 25 senses a human being, it outputs the inductive signal to the single chip circuit 24, the single chip circuit 24 outputs a control signal to the constant current circuit 27 to drive the constant current circuit 27 to work, the constant current circuit 27 outputs electric energy to the light source 31 to make the light source lighted; at the same time, the single chip circuit 24 extracts the picture the monitor 21 acquires;

C. the single chip circuit 24 sends out the pictures the monitor 21 acquires in a preset sending mode via the Wifi receiving-sending module 23 and a wireless router 4; the preset sending mode comprising sending the pictures the monitor 21 acquires to a specified mailbox 41 and save, sending to a specified hand phone 42, the hand phone 42 receives the pictures synchronously, the hand phone 42 alerts according to a presetting of the mobile terminal;

D. a hand phone user operates a soft-keyboard of the hand phone 42 up and down or to and fro, a central processor of the hand phone sends out the corresponding operation signals by the hand phone, the single chip circuit receives the operation signals by the network and the wireless router 4 and the Wifi receiving-sending module 23, and then after the single chip circuit 24 analyzes, judges and processes the operation signals, the single chip circuit 24 outputs a control signal to the motor driving circuit 22, the motor driving circuit 22 drives the first motor 32 and the second motor 33 to work, so that the operation up and down or to and fro of the hand phone user on the soft-keyboard is synchronous with the rotation up and down or to and fro of the camera, thus real-time monitoring the activity of entering human in a monitoring area;

E. when the microwave inductive circuit 25 senses that the human being left, the microwave inductive circuit 25 outputs the inductive signal to the single chip circuit 24, the single chip circuit 24 outputs a control signal to the constant current circuit 27 to make the constant current circuit 27 inactive, the constant current circuit 27 stops supplying energy to the light source 31, the light source 31 stops lighting; at the same time, the single chip circuit 24 stops sending out the pictures the monitor 21 acquires.

The multi-functional lighting device with intelligent network monitoring and the monitoring method of the present invention is applied with mechanical and automatic control mechanism combined with a plurality of inductors, the single chip 24 automatically controls the on-off of the lighting device and the light intensity with monitoring function. The present invention is disposed with high energy lithium-ion battery, so that it works even in an off main supply situation, it can be served as an emergency light. The present invention is applied with the inductors to sense a change of the environment, and sends analog signals to the single chip, after the single chip is processed, it sends out a control signal to control the stepper motor and the lighting device to work. When a human being closes, the lighting device automatically turns on to send light and takes pictures, the pictures are to a preset hand phone via WIFI, the hand phone can control the camera to rotate up and down or left and right. The present invention is applied with the microwave inductive circuit 25 and a light inductive circuit 26 to automatically turn on the lighting device to send light when there is someone near by and the environmental light is weak.

The multi-functional lighting device with intelligent network monitoring, when severed as a lighting device, is powered by main supply when the main supply normally works, it also can be powered by the storage battery when the main supply is turned off, the light inductive circuit is used to control the lighting device, in daytime, as the light is strong, the light inductive circuit 26 senses the light intensity, sends a light inductive signal to the single chip circuit 24, the single chip circuit 24 compares the signal of the light inductive circuit with a built-in parameter, the single chip circuit 24 controls the power device not to supply power to the light source, so that the light source 31 doesn't send light; in nighttime or when the light is weak, the light inductive circuit 26 sense the light intensity and sends a light inductive signal to the single chip circuit 24, the single chip circuit 24 compares the signal of the light inductive circuit with a built-in parameter, the single chip circuit 24 controls the power device to supply power to the light source. In the present invention, the single chip circuit 24 is set that the lighting device sends light when there is someone closing and the lighting device doesn't send light when no one closes. As a monitoring device, the monitor 21 works all day, when there is someone closing to the monitoring area, the lighting device sends light, the camera take pictures to the entering human being, the pictures are sent to a preset mailbox 41 via wireless router 4, and the preset hand phone 42 alerts. The hand phone 42 has a wireless internet connection 42 to inquire the monitoring area, by the soft-keyboard of the hand phone 42, an area of 0-348° left and right and 108° up and down is visible. The camera is disposed with two motors, one motor controls the camera to rotate left and right, the other one controls the camera to rotate up and down.

Figure 5:
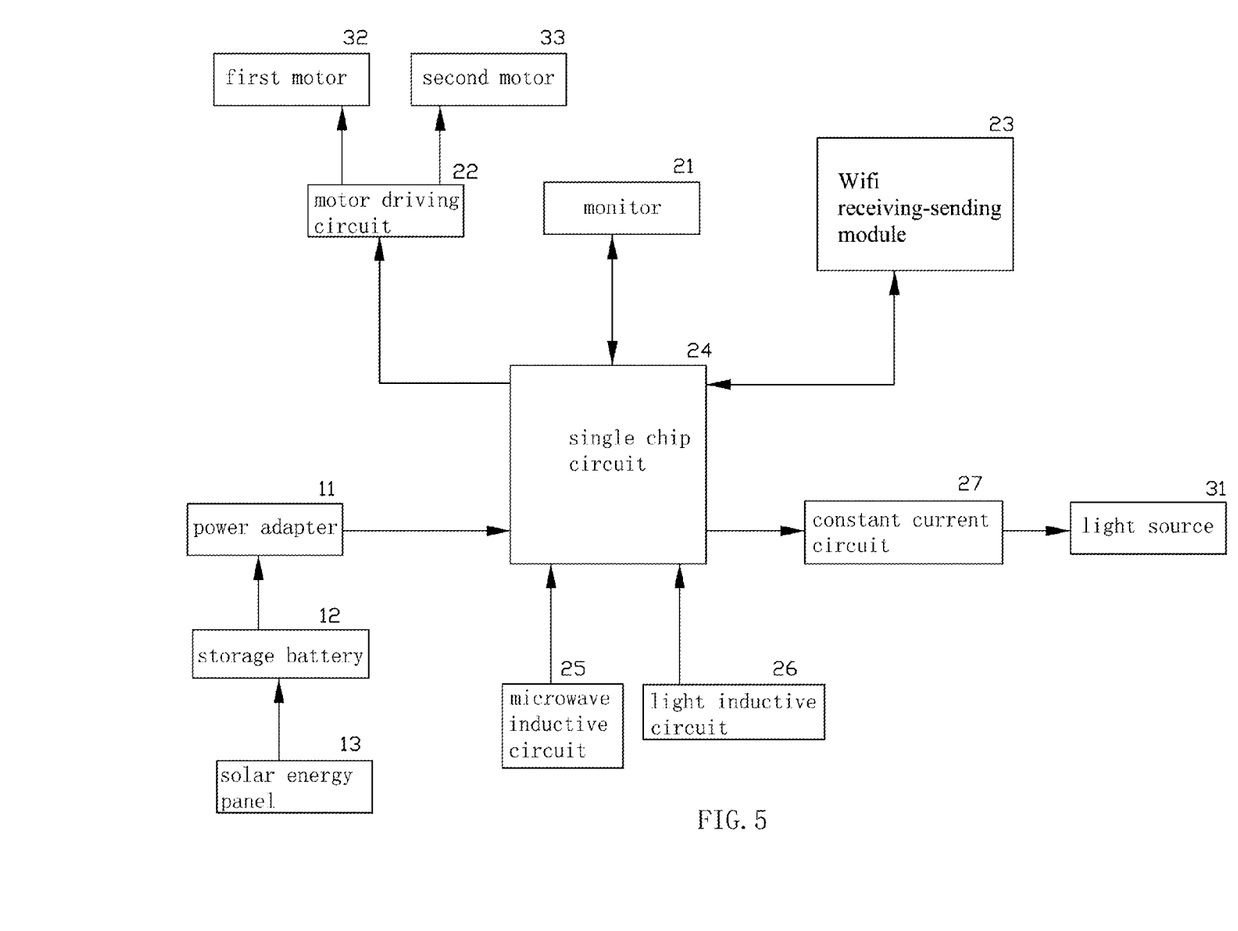
FIG. 5 illustrates a block diagram of circuit principle of the lighting device of a second embodiment of the present invention.

The second embodiment, as figured in FIG. 5, a multi-functional lighting device with intelligent network monitoring and a monitoring method thereof of the present invention in this embodiment has a difference from the first embodiment, the power device further comprises a solar energy panel 13, the solar energy panel 13 is connected to the storage battery 12. as with the solar energy panel 13, in daytime, it absorbs the light energy to convert to electric energy thus to charge the storage battery 12, so that the storage energy 12 has enough power to work even that the main supply is cut off, it is severed as an emergency light.

Figure 6:
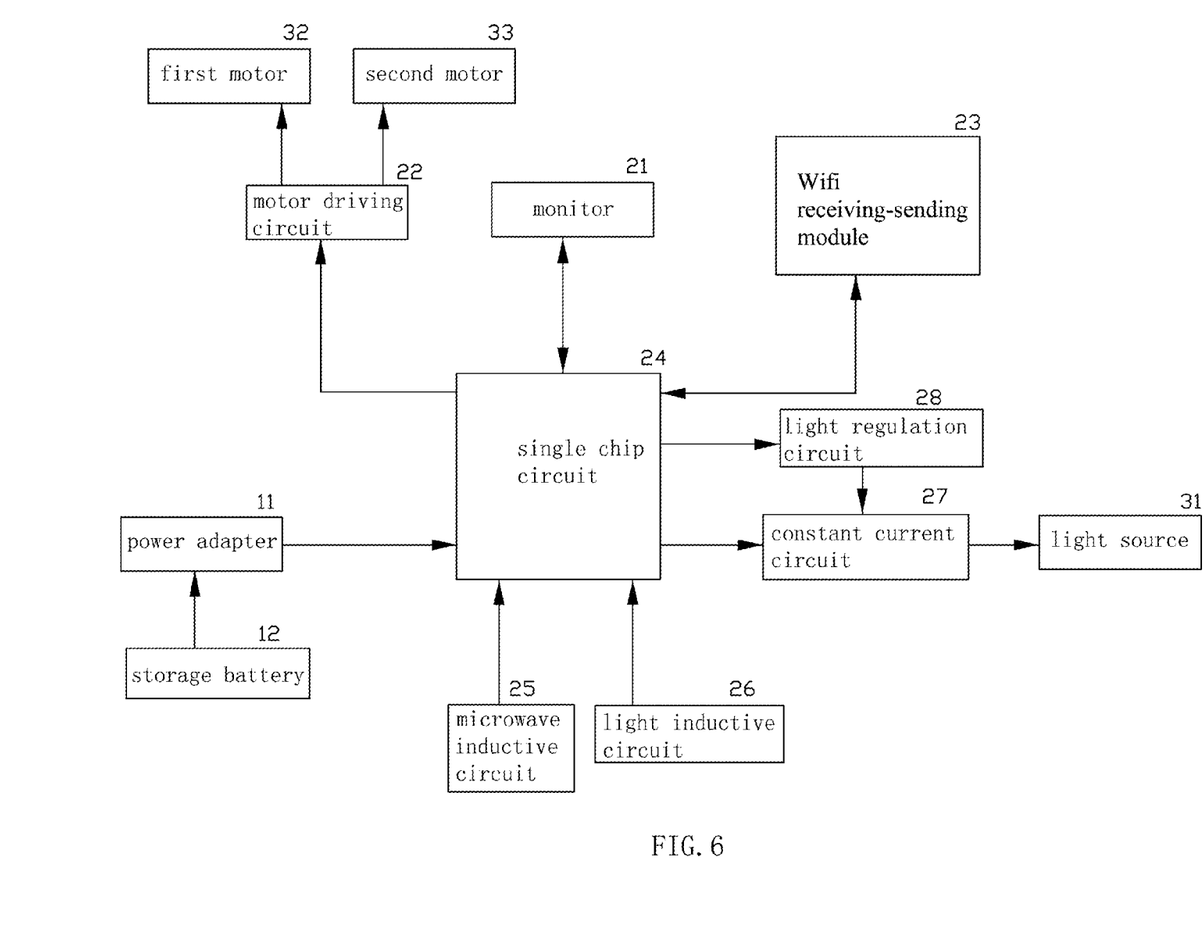
FIG. 6 illustrates a block diagram of circuit principle of the lighting device of a third embodiment of the present invention.

The third embodiment, as figured in FIG. 6, a multi-functional lighting device with intelligent network monitoring and a monitoring method thereof of the present invention in this embodiment has a difference from the first embodiment, it further comprises a light regulation circuit 28, an output of the light regulation circuit 28 is connected to an output of the single chip circuit 24, an output of the light regulation circuit 28 is connected to a control end of the constant current circuit 27. with the light regulation circuit, the light intensity is adjustable, for example, when a human being closes, it sends out a strong light, when no human being closes, it sends out a weak light, thus making it with energy conservation.

Figure 7:
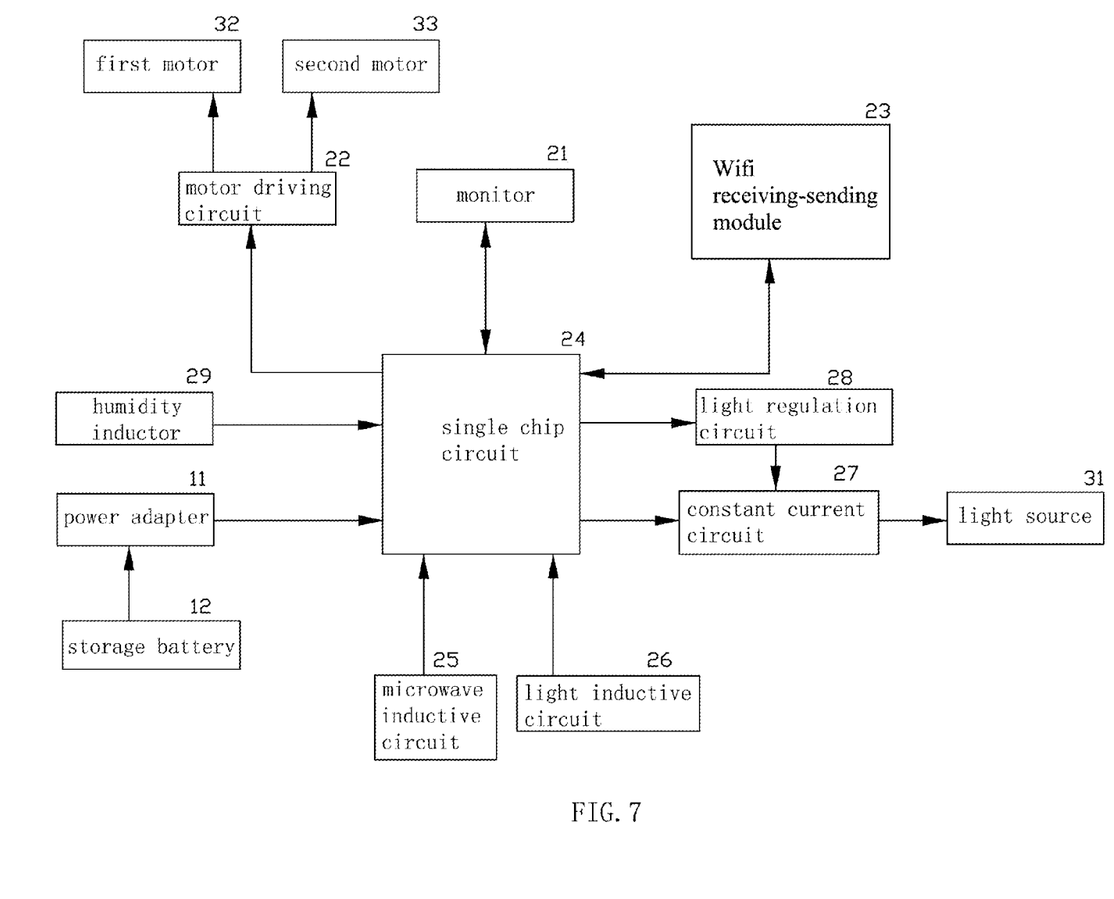
FIG. 7 illustrates a block diagram of circuit principle of the lighting device of a fourth embodiment of the present invention.

The fourth embodiment, as figured in FIG. 7, a multi-functional lighting device with intelligent network monitoring and a monitoring method thereof of the present invention in this embodiment has a difference from the third embodiment, this embodiment further comprises a humidity inductor 29, an output of the humidity inductor 29 is connected to the single chip circuit 24. the present invention is applied with the humidity inductor 29 to automatically adjust the color temperature according to the humidity of the environment, in high humidity day, for example in a foggy weather, the lighting device sends out low color temperature light, low color temperature light has strong penetrability, which is visible far. The chip of the lighting device of the present invention is a GRB COB chip, by changing the proportions of each primary color to adjust different color temperatures and colors, so that the light color is adjustable according to personal favor, or the color is automatically adjusted to make a better mood.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

The invention claimed is:

1. A multi-functional lighting device with intelligent network monitoring, comprising:
   a power supply for providing a power signal;
   a monitor for acquiring monitoring pictures, the monitor having a camera;
   a motor device for controlling the camera;
   a motor driving circuit used to drive the motor device;
   a Wifi receiving-sending module for connecting to a wireless router;
   a single chip circuit for analyzing, judging, and processing input signals and outputting control signals;
   a microwave inductive circuit for sensing a distance between a human being and the lighting device;
   a constant current circuit for supplying a constant current to the light source;
   a light source for sending light;
   a light regulation circuit connected to the constant current circuit for adjusting a light intensity; and
   an output of the power supply being connected to the single chip circuit; an output of the microwave inductive circuit being connected to an input of the single chip circuit, an output of the single chip circuit being connected to an input of the constant current circuit, an output of the constant current circuit being connected to the light source,
   wherein the monitor is connected to the single chip circuit; the single chip circuit is connected to the Wifi receiving-sending module; an output of the single chip circuit is connected to an output of the motor driving circuit, an output of the motor driving device is connected to the motor device,
   the single chip circuit judges a signal of the microwave inductive circuit, when the signal satisfies a preset condition, the preset condition being that the microwave inductive circuit senses that the distance between a human body and the lighting device is less than or equal to 6 meters, the single chip circuit sends a control signal to the constant current circuit to turn on the light source, the single chip circuit sends a picture the monitor acquires to a mobile telephone via the Wifi receiving-sending module, and receives a command from the mobile telephone and send a control signal to the motor driving circuit to control the camera of the monitor; and
   the light regulation circuit adjusting the light intensity according to the distance between the human being body and the lighting device, such that the light regulation circuit strengthens the light intensity when the human body is closer to the lighting device and weakens the light intensity when the human body is further away from the lighting device.

2. The multi-functional lighting device with intelligent network monitoring according to claim 1, wherein further comprising a light inductive circuit to sense the light intensity, an output of the light inductive circuit is connected to the single chip circuit.

3. The multi-functional lighting device with intelligent network monitoring according to claim 1, wherein an output of the light regulation circuit is connected to an output of the single chip circuit, an output of the light regulation circuit is connected to a control end of the constant current circuit.

4. The multi-functional lighting device with intelligent network monitoring according to claim 1, wherein further comprising a humidity inductor, an output of the humidity inductor is connected to the single chip circuit.

5. The multi-functional lighting device with intelligent network monitoring according to claim 1, wherein the motor device comprising a first motor to control the camera of the monitor to rotate left and right and a second motor to control the camera of the monitor to rotate up and down, two outputs of the motor driving circuit are respectively connected to the first motor and the second motor.

6. The multi-functional lighting device with intelligent network monitoring according to claim 5, wherein the angle of rotation left and right of the camera is 0-174° left and 0-174° right; the angle of the rotation up and down of the camera is 0-54° up and 0-54° down.

7. The multi-functional lighting device with intelligent network monitoring according to claim 1, wherein the single chip circuit sends the pictures the monitor acquires to a specified mailbox to be saved by the Wifi receiving-sending module.

8. The multi-functional lighting device with intelligent network monitoring according to claim 1, wherein the power supply comprising a power adapter and a storage battery, the storage battery is connected to the power adapter, an output of the power adapter is connected to the single chip circuit.

9. The multi-functional lighting device with intelligent network monitoring according to claim 8, wherein the power supply further comprising a solar energy panel, the solar energy panel is connected to the storage battery.

10. The multi-functional lighting device with intelligent network monitoring according to claim 1, wherein the light source is a COB chip.

* * * * *